United States Patent [19]

Langer

[11] Patent Number: 4,809,446

[45] Date of Patent: Mar. 7, 1989

[54] BLOWER ARRANGEMENT FOR BLOWING A TREATMENT MEDIUM ONTO A LONGITUDINALLY MOVING MATERIAL WEB

[75] Inventor: Rudolf Langer, Lindau, Fed. Rep. of Germany

[73] Assignee: Lindauer Dornier Gesellschaft mbH, Lindau/Bodensee, Fed. Rep. of Germany

[21] Appl. No.: 157,511

[22] Filed: Feb. 17, 1988

[30] Foreign Application Priority Data

Feb. 17, 1987 [DE] Fed. Rep. of Germany ....... 3704910

[51] Int. Cl.$^4$ ............................................. F26B 13/00
[52] U.S. Cl. ......................................... 34/156; 34/160
[58] Field of Search ................. 34/151, 152, 155, 156, 34/160

[56] References Cited

U.S. PATENT DOCUMENTS

| | | | |
|---|---|---|---|
| 4,021,931 | 5/1977 | Russ et al. ............................ | 34/156 |
| 4,060,914 | 12/1977 | Hoffman ............................ | 34/160 X |
| 4,414,757 | 11/1983 | Whipple ............................ | 34/160 X |
| 4,467,537 | 8/1984 | Tratscher ............................ | 34/160 X |

FOREIGN PATENT DOCUMENTS 1911020 9/1971 Fed. Rep. of Germany .
3007752 11/1981 Fed. Rep. of Germany .

Primary Examiner—Steven E. Warner
Attorney, Agent, or Firm—W. G. Fasse; D. H. Kane, Jr.

[57] ABSTRACT

In a blower arrangement for blowing a gaseous treatment medium onto a longitudinally moving material web, nozzle plenums are arranged above and below the web and extend essentially perpendicularly to the transport direction of the web. Each nozzle plenum is divided lengthwise into two channels arranged one above the other by means of a horizontal partition wall. At one end of the nozzle plenum, both channels are simultaneously supplied with treatment medium flow, whereas at the other end, both channels are interconnected for flow between them. The lower channel including the blower nozzles is further divided by a diagonally extending vertical separation wall forming two complementary wedge-shaped tapering partial chambers which both simultaneously supply treatment medium to the blower nozzle or nozzles.

5 Claims, 3 Drawing Sheets

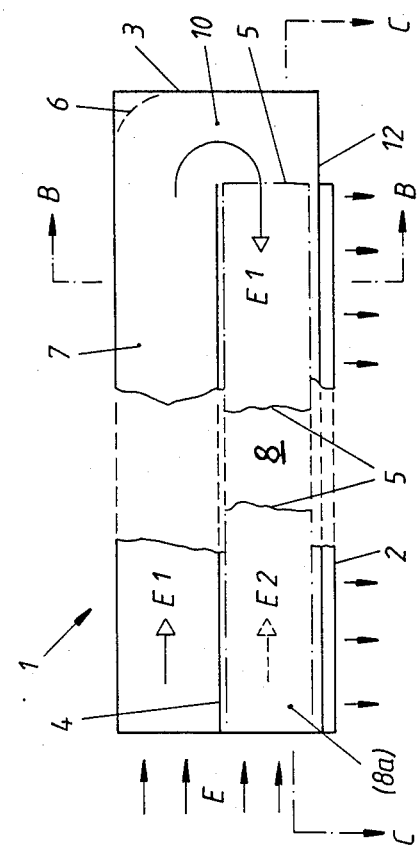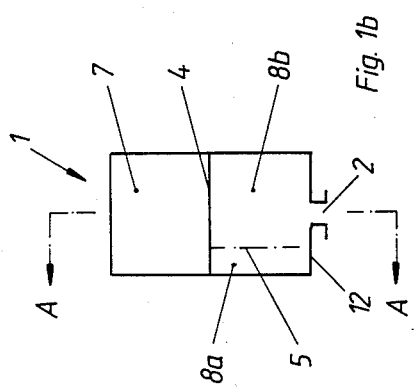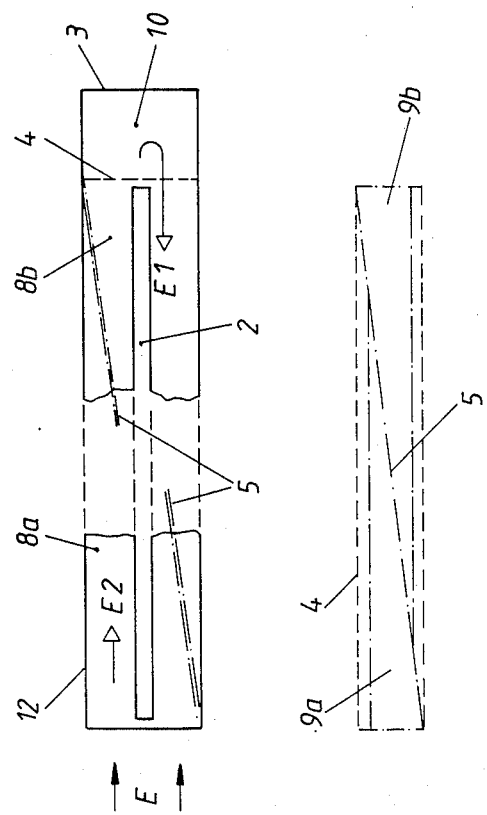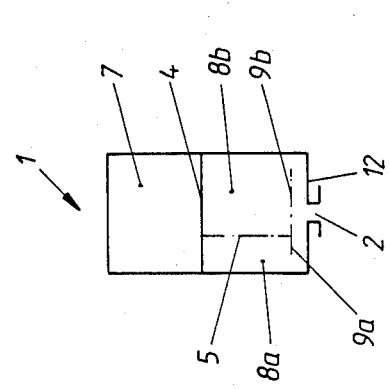

BLOWER ARRANGEMENT FOR BLOWING A TREATMENT MEDIUM ONTO A LONGITUDINALLY MOVING MATERIAL WEB

FIELD OF THE INVENTION

The invention relates to a blower arrangement for blowing a treatment medium onto a longitudinally moving material web by means of blowing nozzles provided in nozzle boxes or plenums arranged above and below the web and extending substantially perpendicularly to the lengthwise direction of travel of the web.

DESCRIPTION OF THE PRIOR ART

Treatment medium blowing boxes of the type mentioned above are known in the art. Such boxes are equipped with a row of nozzles or with one longitudinal slit nozzle facing the web. Usually two boxes are employed, one of which is arranged above the web with the nozzles facing downwardly and the other is arranged below the web with the nozzles facing upwardly. Both boxes extend approximately across the width of the web passing longitudinally through a treatment chamber.

The treatment medium is conventionally introduced into the nozzle or blower boxes by a blower fan connected to one side of the nozzle boxes equipped with slit type nozzle openings extending across the width of the web for blowing the treatment medium onto the surface of the goods such as a web of plastics material or a fabric.

Supplying the gaseous treatment medium to the nozzle boxes from one side of the boxes has the undesirable characteristic that the blowing or treatment medium is not directed out of the nozzles perpendicularly onto the surface of the web, but rather at an angle to the vertical. Another disadvantage is seen in that the blow out velocity of the gaseous jet is non-uniform over the length of the nozzle box. These characteristics are disadvantageous because particularly the heat transfer and thus the desired heat removal are substantially reduced due the slanted direction of the blowing medium relative to the surface of the web. The non-uniform blowing speed results in a non-uniform cooling effect. Additionally, the slanted blowing direction has a negative effect on the quality of the web material, for example folds or wrinkles may be formed.

It is known to improve the outflow of the treatment medium by means of inserts such as baffle plates, made, for example of corrugated sheet metal, to form flow impeding bodies located close to the blow out nozzles. However, such sheet metal inserts or flow impeding bodies must be constructed in accordance with the requirements of the individual situation, especially with due regard to the nozzle construction and/or with due regard to the nozzle dimensions. Thus, these inserts for guiding the blowing or treatment medium make the respective boxes rather expensive. Besides, these inserts interfere substantially with keeping the treatment blow boxes clean.

The treatment of films or foils of synthetic material has been subject to ever increasing stringent requirements regarding the velocity distribution of the treatment medium flowing out of the nozzles or nozzle, and especially with regard to the flow direction of the medium out of the nozzles relative to the surface of the material to be treated. Thus, in addition to nozzle boxes equipped with treatment medium inlets at one side of the box, boxes have become known into which the treatment medium is introduced at both ends. Such a treatment medium supply into both ends of the nozzle box avoids using the above mentioned inserts and still achieves blow out directions perpendicularly to the surface of the material web and also a satisfactory distribution of the blowing speed throughout the length of the blow or nozzle box. However, for structural reasons it is not always possible to install into certain machines nozzle boxes with a treatment medium supply at both ends.

German Patent Publication (DE-AS) No. 1,911,020 discloses, for example, an apparatus for the heat treatment of a web of goods by means of an air stream. The air stream is guided through aerating boxes or nozzle channels which, depending on their location, are equipped with nozzles. The nozzles are located either in the bottom or downwardly facing side wall or in the top or upwardly facing side wall. The nozzles may be slit nozzles or other aperture type nozzles. The treatment air stream is supplied through one end wall of the nozzle box and control flaps are used for regulating the air flow. The flow cross-sectional area of the nozzle channels can remain the same throughout the length of the nozzle channels from the air inlet end to the free end or, for certain purposes the flow cross-sectional area may diminish from the inlet end toward the free end. In the nozzle boxes or nozzle channels having a uniform cross-sectional flow area through their length, an adjustment flap is provided for each box. The adjustment flap divides the respective nozzle channel into an upper partial space and into a lower partial space or channel. The upper partial space or channel has air exit nozzles facing upwardly while the lower partial space or channel has air exit nozzles facing downwardly. The air adjustment or regulating flap is hinged to a tilting axis mounted approximately in the center of the nozzle channel. This tilting axis extends in parallel to the fabric or film web. This mounting of the tilting axis makes it possible to discharge treatment medium either upwardly or downwardly depending on the instantaneous position of the adjustment flap. When the adjustment flap is in a substantially horizontal position approximately in parallel to the material web, the adjustment flap forms a type of intermediate wall for the nozzle channel, thereby guiding one half of the air stream upwardly to the upwardly directed air discharge nozzles and the other half of the air stream downwardly to the downwardly directed air discharge nozzles. Such a nozzle channel makes it possible to selectively treat the downwardly facing surface of a web travelling above the nozzle channel or to treat the upwardly facing surface of a web travelling below the nozzle channel, or to treat both material webs simultaneously with the air stream.

As mentioned above, nozzle channels, for example in the form of so-called nozzle fingers, which are supplied with the gaseous treatment medium at one end, have the disadvantage that the out-flow of the treatment medium through the nozzle openings is not uniform over the length of the blowing nozzles. Neither the outflow speed nor the outflow quantity, nor the outflow direction is uniform over the length of the nozzle or nozzles. This undesirable non-uniformity cannot be avoided even if the nozzle channels are formed with a slanted side wall so that the flow cross-sectional area of the nozzle channel diminishes from the inlet end toward the free opposite end. Depending on the inflow conditions in the nozzle channel or nozzle finger, and due to the horizontal flow of the gas stream into the nozzle box or by an injector effect, or by eddy currents, further disturbances may be caused in the distribution of the outflow speed throughout the flow of the nozzle.

It is known to alleviate this problem or deficiency to achieve a more uniform distribution of the outflow speed at the nozzles or throughout the nozzle length. It is also known to install baffles into the nozzle channels, for example, in the form of apertured sheet metal members, guide members, or flow impeding components or bodies. However, these improvements of the prior art must be adapted to the individual requirements of any particular situation, especially with due regard to the nozzle construction and/or the nozzle dimensions.

Reference is made in this connection, for example, to German Patent (DE-PS) No. 3,007,752 in which the nozzle fingers are divided into two back-up chambers or spaces one above the other for improving the flow conditions. In such a structure a corrugated sheet metal type cover is provided above the slit nozzle. This cover is partially covered itself along its edge on its upper and lower side by a mounting frame or bracket forming separation walls. Due to the back-up chambers arranged one above the other, and due to the corrugated sheet metal cover, the gas stream is deflected repeatedly prior to its exit through the nozzles, whereby the flow conditions between the upper and lower back-up chamber is stabilized so that the outflow of the treatment medium of the nozzle or nozzles appears to be substantially uniform. However, this type of arrangement still has the disadvantage that it is relatively complicated in its internal structure of the nozzle finger. Further, it is necessary to accommodate the internal structure to the individual requirements or operating conditions that may differ from one case to another. As a result, the outflow conditions are only uniform to a limited extent.

U.S. Ser. No.: 073,993 is not prior art since its U.S. filing date of July 16, 1987 is more recent than the present priority date of Feb. 17, 1987. However, the content of U.S. Ser. No.: 073,993 is summarized herein as follows.

U.S. Ser. No.: 073,993 describes a blower arrangement by means of which the treatment medium may be blown onto the material web to be treated in a direction as perpendicular as possible to the material web plane. This feature of the related disclosure is an improvement over the above described prior art. In the related disclosure each nozzle plenum or box is divided longitudinally into two channels extending one above the other by a horizontal partition wall. At one end of each nozzle plenum, a supply of treatment medium is simultaneously delivered to both channels. At the other end of each nozzle plenum, the two channels are interconnected through a cut-out or hole in the partition wall. These features have achieved an improvement of the blowing direction of the treatment medium without the installation of additional specialized components. Thus, in practice the treatment medium impinges upon the material web to be treated in a direction perpendicular to the plane of the web. The blowing nozzles have the form of long extended slits or of a row of single nozzles each having a more or less elongated shape. All of these types of nozzles will be referred to as slit nozzles in the following description.

However, in certain cases it is not sufficient merely to provide a uniform blowing direction of the treatment medium in a direction as perpendicular as possible to the material web to be treated. It is also desirable under certain circumstances to avoid variations in the temperature distribution of the blown treatment medium along the length of the slit nozzles.

OBJECTS OF THE INVENTION

In view of the foregoing it is the aim of the invention to achieve the following objects singly or in combination:

- in a blower arrangement for blowing a treatment medium onto a longitudinally moving material web, to achieve a uniform blowing direction of the treatment medium, preferably in a direction perpendicular to the material web, with relatively simple means and without installation of additional specialized components;
- to achieve a uniform temperature distribution of the treatment medium being blown from such a blower arrangement; and
- to achieve a uniform quantity distribution of treatment medium being blown from such a blower arrangement.

SUMMARY OF THE INVENTION

The above objects have been achieved in a blower arrangement for blowing a treatment medium onto a material web according to the invention, whereby the treatment medium may be blown onto the material web to be treated in a direction as perpendicular as possible to the material web plane. Each nozzle plenum or box is divided longitudinally by a horizontal partition wall into two channels extending one above the other. Additionally, the lower channel closer to the blowing nozzle or nozzles is divided by a vertical separation wall extending perpendicularly to the partition wall and at a slant from one end of the lower channel to the other end of the lower channel, thereby separating the lower channel into two wedge-shaped chambers tapering in opposite directions. At one end of the nozzle plenum, a supply of treatment medium is simultaneously delivered to both channels. At the other end of each nozzle plenum, the two channels are interconnected through a cut-out or hole in the partition wall. The blowing nozzles have the form of long extended slits or of a row of single nozzles each having a more or less elongated shape and are arranged in the channel facing the material web.

Thus, the lower channel, the bottom of which is provided with the blower nozzles, is separated into two overlapping or complementary wedge-shaped chambers by the above mentioned vertical separation wall extending diagonally along the length of the horizontal partition wall, but extending in a direction perpendicularly to the horizontal wall, whereby the blower nozzles are supplied with treatment medium through both wedge-shaped chambers together. The channel which is partitioned into wedge-shaped chambers as described above, may comprise an essentially rectangular major cross-section. Additionally, a triangular cross-sectional pressure head chamber may be attached on the side of the rectangular cross-sectional chamber facing the material web, whereby this pressure head chamber carries the blower nozzles. The vertical separation wall may at least partially extend into the triangular cross-sectional pressure head chamber. The triangular cross-sectional pressure head chamber may be separated at least partially from the rectangular cross-sectional chamber by means of a separating wall or second horizontal partition.

It has been found that the above features assure a uniform temperature and quantity distribution of the treatment medium being blown through the nozzles along the full length of the nozzle plenums. Furthermore, a uniform blowing direction of the treatment medium is achieved in a direction essentially perpendicular to the plane of the web of material to be treated.

BRIEF DESCRIPTION OF THE DRAWINGS

In order that the invention may be clearly understood, it will now be described, by way of example, with reference to the accompanying drawings, wherein:

FIG. 1a is a lengthwise section through a nozzle plenum or box according to the invention along the L section line A—A of FIG. 1b;

FIG. 1b is a cross-section through the nozzle plenum along the section line B—B of FIG. 1a;

FIG. 1c is a lengthwise section through the nozzle plenum along the section line C—C of FIG. 1a;

FIG. 2a is a view similar to that of FIG. 1b, but of an alternative arrangement having an additional horizontal partition;

FIG. 2b is a simplified plan view showing the relative location of the horizontal partition wall and of the vertical separation wall according to FIG. 2a;

FIG. 3b is a cross-section through the nozzle plenum of FIG. 3a along the section line X—X of FIG. 3a;

FIG. 4b is a cross-section through the nozzle plenum of FIG. 4a; and

Figure 3B:
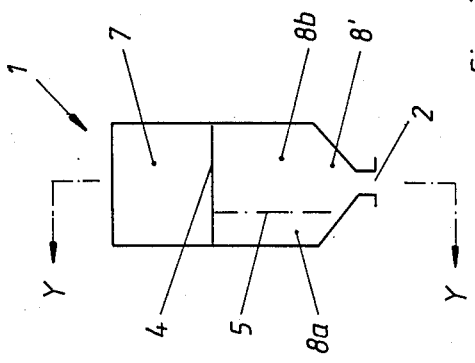

DETAILED DESCRIPTION OF PREFERRED EXAMPLE EMBODIMENTS AND OF THE BEST MODE OF THE INVENTION

The general construction of the blower arrangement according to the invention will now be described with reference to FIGS. 1a to 1c showing a single nozzle plenum or box arranged above a material web to be treated. The following description of this upper nozzle plenum is intended to apply analogously to a lower nozzle plenum arranged in a mirror-symmetrical fashion below the material web. The material web is not shown, but it extends below the nozzle plenum and is transported in a direction perpendicular to the plane of the drawing in FIG. 1a. The nozzle plenum or box 1 is enclosed largely by a top cover surface and two side walls which are not referenced in detail, a floor or bottom surface 12, and an end wall 3. A slit nozzle 2 is provided in the floor surface 12 and may be embodied, as described above, either as a continuous slit or as a row of single nozzles. A horizontal partition wall 4 divides the nozzle plenum 1 into an upper duct or nozzle channel 7 and a lower duct or nozzle channel 8. At one end of the nozzle plenum 1 the horizontal partition wall 4 does not extend to meet the respective end wall 3 of the nozzle plenum 1. Instead, an open cut-out 10 is provided in the partition wall 4, whereby the two channels 7 and 8 are interconnected. The treatment medium is supplied in the direction of the arrows at the input or entrance end E, simultaneously into both the upper channel 7 and the lower channel 8. The treatment medium partial stream E1 is directed into the upper channel 7 as shown by the arrow E1, and the treatment medium partial stream E2 is delivered into the lower channel 8 as shown by the arrow E2. A curved arrow also referenced by E1 represents the flow of the partial stream E1 from the upper channel 7 through the cut-out 10 into the lower channel 8. As will be described in greater detail below, the partial stream E1 is directed along the front side of a vertical separation wall 5, whereby the arrow E1 is shown with solid lines. On the other hand, the lower partial stream E2 is directed along the backside of the vertical separation wall 5, whereby the arrow E2 is shown with dashed lines. At the right end wall 3 of the nozzle plenum 1, opposite the material entrance end E, a deflector 6 or other appropriate means may be additionally provided if necessary, to improve the redirection of the partial stream E1 from the upper channel 7 into the lower channel 8.

The lower channel 8 is divided into two complementary wedge-shaped partial chambers 8a and 8b by the vertical separation or dividing wall 5 shown by dash-dotted lines. The separation wall 5 is vertically arranged to extend between the horizontal partition wall 4 and the floor surface 12 of the nozzle plenum 1, whereby the separation wall 5 extends diagonally across the length of the horizontal partition wall 4 from the entrance end E toward the opposite end wall 3 of the nozzle plenum 1. At its beginning and its end, the separation wall 5 adjoins directly with the side walls of the nozzle plenum or box and is similarly closed along its top edge by directly adjoining the horizontal partition wall 4. However, the bottom edge of the vertical separation wall 5 does not extend completely to reach the floor or bottom surface 12 of the nozzle plenum 1, so that a gap remains to allow flow of the treatment medium to the blower nozzle 2 which is shown here as a single long slit. In this manner, two complementary wedge-shaped tapering partial chambers 8a and 8b are formed. One partial chamber 8a is directly supplied with treatment medium at its wider end by the partial stream E2 at the left or entrance end E of the nozzle plenum 1. Here, the entire cross-sectional area of the channel 8 is available as the inlet cross-sectional area at the wide end of the wedge-shaped chamber 8a. As shown in FIG. 1a, and as mentioned above, the treatment medium partial flow E2 delivered to the partial chamber 8a is shown by a dashed arrow line. The wedge-shaped partial chamber 8a tapers toward its end near the cut-out 10 so that the cross-sectional area of the wedge-shaped chamber 8a decreases toward the right in FIG. 1a. In a complementary fashion at this location near the cut-out 10, the oppositely directed wedge-shaped partial chamber 8b has its largest cross-sectional area which is again the entire cross-sectional area of the lower channel 8 and serves as the inlet for the partial stream E1. Correspondingly, the cross-section of the partial chamber 8b continually decreases toward its tapered end near the entrance end E. The separation or dividing wall 5 is arranged in a manner so that both wedge-shaped partial chambers 8a and 8b are connected with the slit nozzle 2, and thereby both partial chambers 8a and 8b supply treatment medium to the slit nozzle 2. Here, in a typical manner, the blower nozzle 2 may extend linearly in the floor or bottom surface 12 of the nozzle plenum 1 in a direction perpendicular to the transport direction of the material web to be treated. Through the cooperative or complementary effect of the complementary partial chambers 8a and 8b both supplying treatment medium to the slit nozzle 2, not only is a uniform blowing direction achieved as shown in FIG. 1a by a plurality of short arrows, but also a uniform temperature distribution along the length of the slit nozzle 2 is achieved.

In FIG. 1c the diagonal orientation of the separation wall 5 over the length of the partition wall 4 extending to the beginning of the cut-out 10 is shown by dash-dotted lines. The slit nozzle 2 and the boundaries of the floor or bottom surface 12 are shown by solid lines. The end of the horizontal partition wall 4 at the cut-out 10 is shown by dashed lines.

According to a further detail embodiment of the invention as shown in FIG. 2a, the vertical separation wall 5 is again arranged at an angle or diagonally in the channel 8 so that two tapering partial chambers 8a and 8b are formed as described above. However, in contrast to the arrangement shown in FIG. 1b, here in FIG. 2a the bottom edge of the separation wall 5 does not end in the free space of the channel 8, but instead joins a horizontal partition 9 extending in parallel to the floor or bottom surface 12. A portion 9a of the partition 9 extends from one side of the separation wall 5 and thereby partially bounds the tapering wedge-shaped chamber 8a. A second portion 9b of the partition 9 extending in a direction opposite to the portion 9a extends into and partially bounds the wedge-shaped chamber 8b. The lateral edges of the partition members 9a and 9b extend in parallel to the side walls of the nozzle plenum 1. However, the edges of the partition 9 do not extend fully to contact the side walls of the nozzle plenum 1, but instead the width of the entire partition 9 is small enough to leave sufficient space between the edges of the partition 9 and the respective side walls of the nozzle plenum 1 so that a sufficient flow connection is established between the tapering wedge-shaped partial chambers 8a and 8b and the blower nozzle 2.

FIG. 2b is a simplified plan view on a reduced scale of the separation wall 5 and the partial partitions 9a and 9b extending laterally therefrom, as shown by dash-dotted lines. Dashed lines show the boundaries of the horizontal partition wall 4 or correspondingly the location of the side walls of the nozzle plenum. The flow passage or gap is clearly visible between the dash-dotted edges of the partitions 9a and 9b and the respective dashed side wall 4.

Figure 3A:
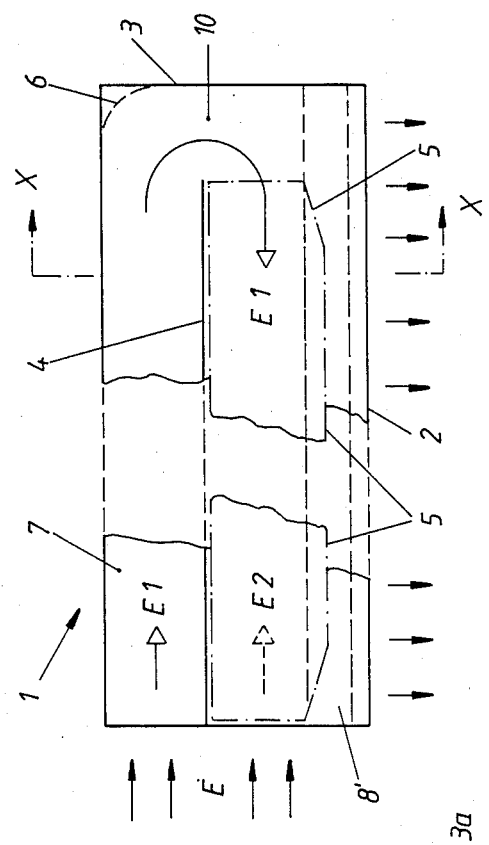
FIG. 3a is a lengthwise section through another embodiment of a nozzle plenum or box along the section line Y—Y of FIG. 3b.

A slightly different example embodiment will now be described with reference to FIGS. 3a and 3b. FIG. 3b is a cross-section through a nozzle plenum along the section line X—X of FIG. 3a while the lengthwise section shown in FIG. 3a is taken along the section line Y—Y of FIG. 3b. The general structure of the nozzle plenum 1 corresponds to the structure of the arrangement described with reference to FIG. 1 and therefore will not be described again. The structural difference shown in FIG. 3a and FIG. 3b is that, unlike the arrangement of FIG. 1, the lower channel 8b formed by the partition wall 4 does not simply have a rectangular cross-section. Instead, an additional triangular cross-sectional damming chamber 8' is cooperatively arranged to extend along the major channel portion 8b having a rectangular cross-section. The slit nozzle 2 is arranged along the bottom edge or triangular apex of the chamber 8' acting as a pressure head chamber. The diagonally extending separation wall 5 provided in the lower nozzle channel 8 is arranged in the rectangular cross-sectional portion of the channel in a manner analogous to that of FIG. 1.

As described with reference to FIG. 1, the separation wall 5 again serves to divide the channel 8 into two complementary wedge-shaped partial chambers 8a and 8b. Furthermore, the delivery of treatment medium at the entrance E, and the separation of the delivered stream into partial flows E1 and E2, is the same as that described with reference to FIG. 1. Here, in FIG. 3a and FIG. 3b, the two wedge-shaped partial chambers 8a and 8b are interconnected through the triangular damming chamber 8' and thereby both together supply treatment medium to the blower nozzle 2. Again in this example embodiment, the blower nozzle 2 extends in the long direction of the nozzle plenum 1 or in a direction perpendicular to the transport direction of the web of material to be treated.

Naturally, further modifications of the inventive concept are also possible. For example, the vertical separation wall 5 or at least a portion thereof, after extending vertically through the channel 8, may extend somewhat further to protrude into the damming chamber 8' as is shown in FIGS. 3a and 3b.

Figure 4B:
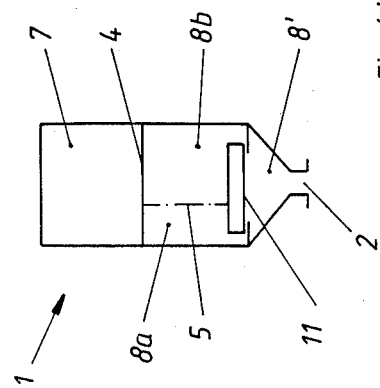
Figure 4A:
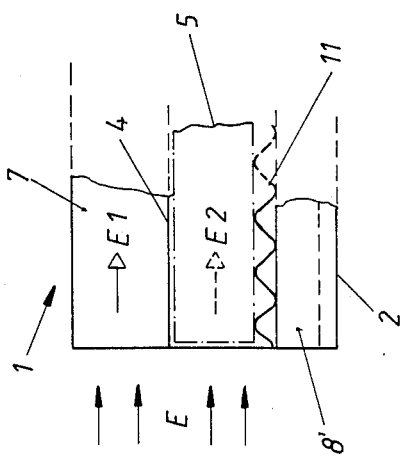
FIG. 4a is a view similar to that of FIG. 3a but of a further embodiment of a nozzle plenum.

Furthermore, in cases where it becomes necessary, additional components, such as for example, cover members in the form of corrugated sheet metal, may easily be arranged below the separation wall 5, approximately in the transition region between the wedge-shaped partial chambers 8a and 8b and the damming chamber 8' located thereunder. Such additional components as, for example, the cover members of corrugated sheet metal, are previously known as such. FIGS. 4a and 4b show an example of the arrangement of such additional components, FIG. 4a is a lengthwise section analogous to FIG. 3a, but only in a partial view. FIG. 4b is a cross-section through a nozzle plenum having an upper channel 7 and a lower channel 8 separated by a horizontal partition wall 4. A damming chamber 8' connects to the blower nozzle 2. As described above, the channel 8 is again divided into two wedge-shaped partial chambers 8a and 8b by means of a diagonally arranged vertical separation wall 5.

A cover member 11 in the form of corrugated sheet metal, which is known as such, for example, from the above mentioned German Patent Publication (DE-PS) No. 3,007,752 is arranged in the lower portion of the partial chambers 8a and 8b in such a manner that the ridges and valleys of the corrugated metal extend in a direction essentially perpendicular to the lengthwise direction of the blower nozzle 2. The cover member 11 may thereby be supported along its lateral edges by an appropriate rim or flange of the nozzle channels 8a and 8b. A gap or spacing remains between the edges of the cover member 11 and the respective side walls of the nozzle channels so that treatment medium may flow from the nozzle channels 8a and 8b from above the cover member 11 through the corrugated profile of the cover member 11 to the underside thereof and into the damming chamber 8' to finally be blown from the blower nozzle 2. The separation wall 5 may advantageously rest upon the upper surface of the cover member 11.

Figure 5:
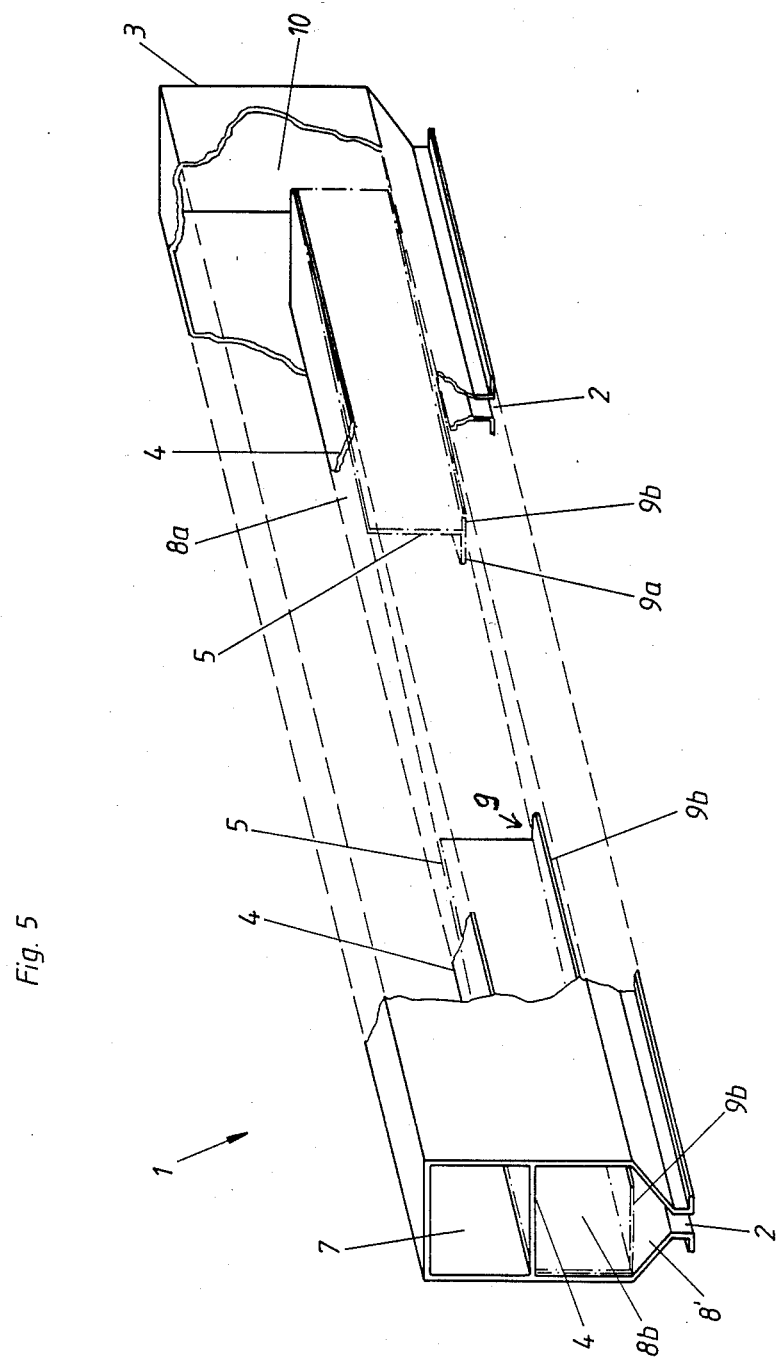
FIG. 5 is a perspective view of a nozzle plenum combining features of FIG. 3a and FIG. 3b, partially in section.

FIG. 5 is a perspective view of a blower arrangement combining features of the example embodiments of FIGS. 2a, 3a, and 3b and shows a nozzle plenum 1 having a pressure head chamber 8' arranged between the nozzle channel 8 and the blower nozzle 2, in a view at an angle from the entrance end of the nozzle plenum 1. As shown, the horizontal partition wall 4 is arranged to extend along most of the length of the nozzle plenum 1 forming an upper channel 7, and a lower channel 8 of which only the wedge-shaped chamber 8b is visible. It should be noted that the wedge orientation of the chambers 8a and 8b has been reversed for the sake of clarity in FIG. 5 relative to the arrangements described above. The diagonally extending vertical separation wall 5 is again shown by dash-dotted lines. The angled or diagonal extension of the separation wall 5 relative to the side walls of the nozzle plenum 1 as well as the bounding contact of the separation wall 5 with the horizontal partition wall 4 are clearly visible. In this embodiment, the vertical separation wall 5 is bounded along its lower edge by a cross wall 9 including flange portions 9a and 9b extending perpendicularly from the separation wall 5. The widths of the flange portions 9a and 9b taper corresponding to the shape of the wedge-shaped partial chambers 8a and 8b respectively.

At the distant end of the nozzle plenum 1 as shown in FIG. 5, the cut-out 10 is shown between the distant end wall 3 and the horizontal partition wall 4. The cut-out 10 establishes a flow connection between the upper channel 7 and the lower channel 8.

Instead of the cross wall 9, other cover means such as the cover members shown in FIG. 4, may also be arranged in the nozzle plenums of the type shown in FIGS. 2a and 2b.

Although the invention has been described with reference to specific example embodiments, it will be appreciated, that it is intended to cover all modifications and equivalents within the scope of the appended claims.

What I claim is:

1. A blower arrangement for blowing a treatment medium against a material web moving in a lengthwise web direction, comprising at least one nozzle box extending perpendicularly to said lengthwise web direction and across said material web, a horizontally extending partition wall in said nozzle box for forming a first box channel and a second box channel, each box channel further comprising an entrance end for admitting a flow of treatment medium into both box channels simultaneously, at least one nozzle means arranged in one of said box channels facing said material web for blowing treatment medium onto said material web, said horizontal partition wall extending longitudinally in said nozzle box from said entrance end toward an opposite box end, a cut-out in said horizontal partition wall for interconnecting the first box channel with the second box channel for providing a flow connection between said first box channel and said second box channel said second box channel further comprising a vertical separation wall arranged to extend diagonally along said horizontal partition wall and perpendicularly thereto, whereby said second box channel is divided into a first and a second complementary wedge-shaped chamber for a treatment medium flow control, whereby said flow of treatment medium is delivered to said nozzle means through both said complementary wedge-shaped chambers simultaneously.

2. The blower arrangement of claim 1, wherein said second box channel comprises a rectangular cross-section, said nozzle box further comprising a pressure build-up chamber having an essentially triangular cross-section arranged between said second box channel and said nozzle means, whereby said flow of treatment medium is delivered through both said complementary wedge-shaped chambers into said pressure build-up chamber and then to said nozzle means.

3. The blower arrangement of claim 2, wherein said vertical separation wall extends at least partially from said second channel into said pressure build-up chamber.

4. The blower arrangement of claim 1, further comprising a second horizontal parition extending essentially in parallel to said first mentioned horizontal partition wall with said vertical separation wall arranged between the two horizontal partition walls, whereby said complementary wedge-shaped chambers are partially bounded on one side by said second horizontal partition wall which is narrower than said nozzle box to leave flow gaps between box walls and said second horizontal partition wall.

5. The blower arrangement of claim 4, wherein said second partition wall comprises a wavy corrugated sheet metal configuration.

* * * * *